United States Patent
Cavarello et al.

(10) Patent No.: US 8,499,892 B2
(45) Date of Patent: Aug. 6, 2013

(54) INTEGRATED ROTARY VALVE

(75) Inventors: Jeffrey M. Cavarello, Hamburg, NY (US); Edward S. Czechowski, Orchard Park, NY (US); Robert M. Kolodziej, Varysburg, NY (US); Michael A. Nuchereno, Amherst, NY (US)

(73) Assignee: Cameron International Corporation, Houston, TX (US)

( * ) Notice: Subject to any disclaimer, the term of this patent is extended or adjusted under 35 U.S.C. 154(b) by 1016 days.

(21) Appl. No.: 12/121,679

(22) Filed: May 15, 2008

(65) Prior Publication Data

US 2009/0014244 A1 Jan. 15, 2009

Related U.S. Application Data

(60) Provisional application No. 60/949,770, filed on Jul. 13, 2007.

(51) Int. Cl.
*F16N 1/00* (2006.01)

(52) U.S. Cl.
USPC .............................. 184/6; 184/6.28; 417/243

(58) Field of Classification Search
USPC .................................. 184/6, 6.28; 417/243
See application file for complete search history.

(56) References Cited

U.S. PATENT DOCUMENTS

| | | | | |
|---|---|---|---|---|
| 1,519,513 A | * | 12/1924 | Smith | 123/41.4 |
| 1,624,388 A | | 4/1927 | Bournonville | |
| 2,371,657 A | * | 3/1945 | Stark | 251/182 |
| 2,547,254 A | | 4/1951 | Braithwaite | |
| 2,679,320 A | * | 5/1954 | Walton | 210/102 |
| 2,897,966 A | * | 8/1959 | Humbert, Jr. | 210/167.02 |
| 3,437,103 A | | 4/1969 | Yoshino | |
| 3,590,844 A | | 7/1971 | Ladenzon et al. | |
| 3,955,473 A | | 5/1976 | Oxley et al. | |
| 4,222,875 A | | 9/1980 | Sikula, Jr. | |
| 4,388,949 A | | 6/1983 | Bonney | |
| 4,397,335 A | | 8/1983 | Doblar et al. | |
| 4,802,506 A | | 2/1989 | Aslanian | |
| 5,219,040 A | * | 6/1993 | Meuer et al. | 184/7.4 |
| 5,573,035 A | | 11/1996 | Kunta | |
| 5,855,226 A | | 1/1999 | Palmer | |

(Continued)

FOREIGN PATENT DOCUMENTS

| | | |
|---|---|---|
| DE | 19754007 | 5/1999 |
| GB | 774912 | 5/1957 |
| JP | 06146835 | 5/1994 |

OTHER PUBLICATIONS

Cameron; Turbo-Air 9000 Centrifugal Air Compressors; pp. 1-5.

(Continued)

*Primary Examiner* — William E Dondero
*Assistant Examiner* — Michael Riegelman
(74) *Attorney, Agent, or Firm* — Fletcher Yoder, P.C.

(57) ABSTRACT

A system in some embodiments includes a machine block comprising features configured to support moving machine components within a lubricating fluid, wherein the machine block includes an integral valve block configured to route the lubricating fluid through a first filter without a second filter and configured to route the lubricating fluid through the second filter without the first filter. Further embodiments include a method that includes switching circulation of a lubricant between a first filter and a second filter in response to an angular position of a valve disposed in a valve block integral to a machine block having moving components lubricated by the lubricant.

15 Claims, 4 Drawing Sheets

U.S. PATENT DOCUMENTS

| | | | |
|---|---|---|---|
| 6,206,653 B1 | 3/2001 | Dewhirst et al. | |
| 6,273,139 B1 * | 8/2001 | Ohmi et al. | 137/884 |
| 6,290,208 B1 * | 9/2001 | Arnett | 251/185 |
| 6,485,636 B1 * | 11/2002 | Moss | 210/117 |
| 6,488,467 B2 | 12/2002 | Czechowski et al. | |
| 6,616,421 B2 | 9/2003 | Mruk et al. | |
| 6,651,688 B2 | 11/2003 | Brand et al. | |
| 6,692,235 B2 * | 2/2004 | Kolodziej et al. | 417/243 |
| 6,941,922 B2 * | 9/2005 | Williams et al. | 123/196 R |
| 7,854,299 B2 * | 12/2010 | Czechowski et al. | 184/6 |
| 2004/0184927 A1 | 9/2004 | Kolodziej et al. | |
| 2004/0237488 A1 * | 12/2004 | Stenersen | 55/482 |
| 2006/0008368 A1 | 1/2006 | Czechowski et al. | |
| 2007/0209878 A1 | 9/2007 | Czechowski et al. | |

OTHER PUBLICATIONS

Cameron; Plant Air Centrifugal Compressors; Turbo-Air; 20 pgs.
PCT Search Report and Written Opinion for PCT Application No. PCT/US2008/063790 dated Aug. 4, 2008.
European Communication for EP Application No. 08 755 606.4—2311 dated Nov. 15, 2010.
Cameron; Turbo-Air 9000 Centrifugal Air Compressors; pp. 1-5, (Aug. 20, 2008).
Cameron; Plant Air Centrifugal Compressors; Turbo-Air; 20 pgs (2007).

* cited by examiner

INTEGRATED ROTARY VALVE

CROSS REFERENCE TO RELATED APPLICATION

This application claims priority to U.S. Provisional Patent Application No. 60/949,770, entitled "Integrated Rotary Valve", filed on Jul. 13, 2007, which is herein incorporated by reference.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Lubrication systems provide a vital role in the operation and maintenance of numerous types of machinery. For example, oil circulation generally reduces friction between system components as well as removes heat and debris. In a gas compressor system, for instance, a fluid lubrication system may be employed to provide lubrication to components, such as bearings and other rotary devices.

A gas compressor system generally includes a mechanical device that increases the pressure of a gas by decreasing its volume. Gas compressors are used in a wide variety of industries including aerospace, automotive, oil and gas refineries, power generation, food and beverage, pharmaceuticals, water treatment, and the like. Generally, gas compressors can be divided into two categories: positive displacement compressors and dynamic compressors. Positive displacement compressors include reciprocating and rotary compressors. Reciprocating compressors typically employ pistons driven by a crankshaft, whereas rotary compressors typically employ multiple helical screws to force the gas into a smaller space. Dynamic compressors include axial compressors and centrifugal compressors. Axial compressors typically employ a series of rotor blades, whereas centrifugal compressors typically employ a vaned rotating disk or impeller. In each of these and other compressor applications, there may be numerous rotating components that rely on mechanisms (e.g., bearings) to provide a minimal resistance between rotating and moving components.

Resistance between components is often characterized by a build up of heat due to friction. Friction may be caused by rough interfaces, debris, and/or an absence of a lubricating fluid (e.g., oil) between components. The increased friction and heat may lead to reduced performance, reduced efficiency, and, in some cases, a detrimental failure of a system. Accordingly, it may be desired to circulate a lubricating fluid between the components (e.g., bearings) to reduce friction, as well as, remove heat and debris.

As will be appreciated, compressor systems typically employ a lubrication system that provides for circulation of a lubricating fluid or gas to critical components. For example, a compressor system may generally include a lubricating oil that is circulated through various lines and passages via a pump. To filter out debris from the circulating oil, the lubrication system may include an oil filtration system (e.g., an oil filter). During circulation, oil may be routed into an oil filter, through a filter medium in the oil filter, and routed back into circulation, for instance. However, after a certain amount of use, the filter medium may become filled with debris, and may be replaced. Replacement of a filter may include removing (e.g. unscrewing or otherwise uncoupling) the filter from the system and replacing the filter. During removal and installation, a compressor may be shutdown to prevent oil from being spilled and/or discharged from the system while the filter is removed. Unfortunately, shutting down a compressor may not be feasible. For example, shutting down the compressor may lead to an increased amount of labor, a lengthy downtime, and/or additional cost.

BRIEF DESCRIPTION OF THE DRAWINGS

Various features, aspects, and advantages of the present invention will become better understood when the following detailed description is read with reference to the accompanying figures in which like characters represent like parts throughout the figures, wherein.

DETAILED DESCRIPTION OF SPECIFIC EMBODIMENTS

Figure 1:
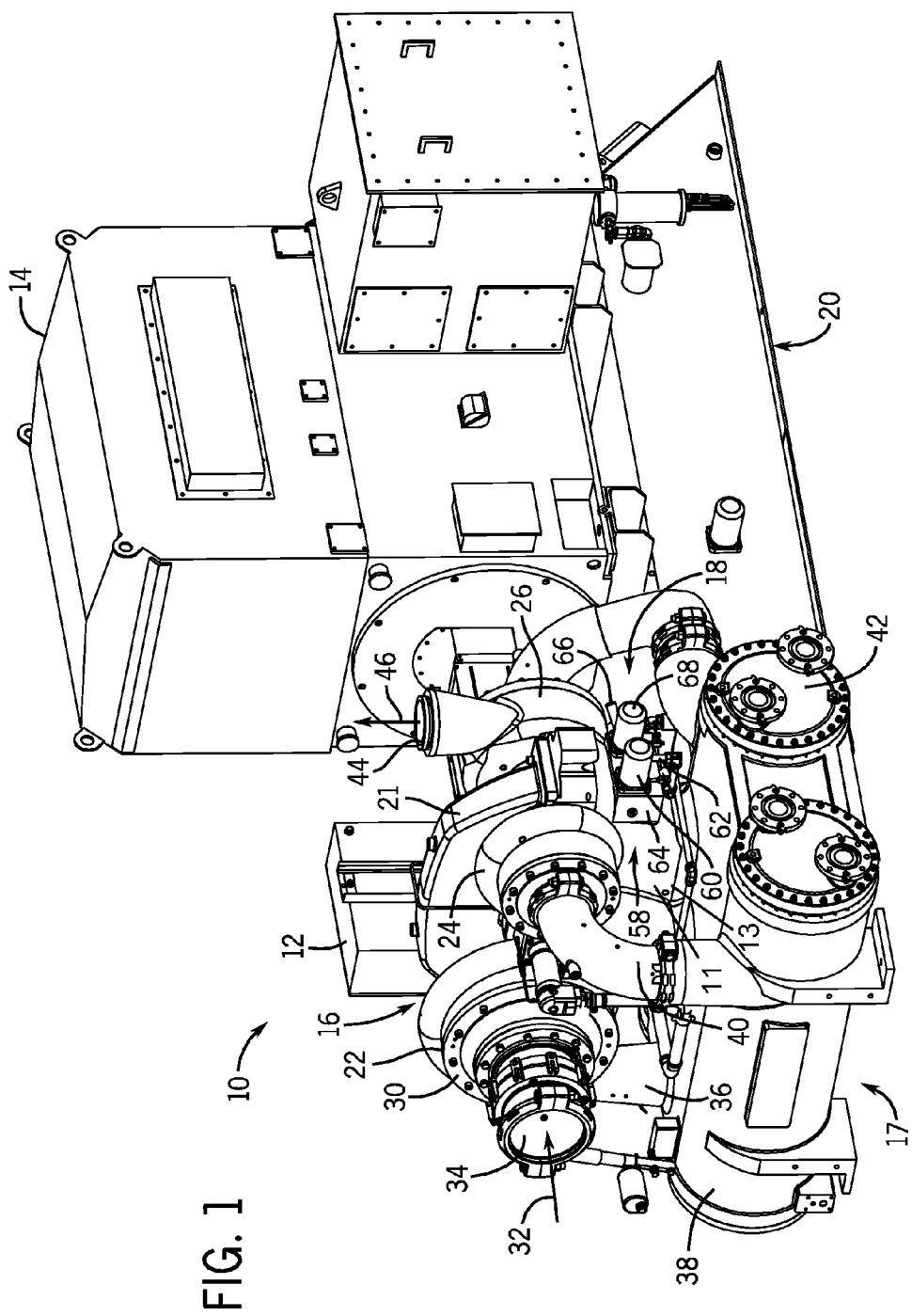
FIG. 1 is a perspective view of an exemplary compressor system having a lubrication system in accordance with an embodiment of the present technique.

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Moreover, the use of "top," "bottom," "above," "below," and variations of these terms is made for convenience, but does not require any particular orientation of the components.

Certain exemplary embodiments of the present invention include a system and method that addresses one or more of the above-mentioned inadequacies of conventional lubrication systems. For instance, the disclosed embodiments may include a compressor lubrication system having a dual filter configuration and an integral valve. The integral valve may enable the flow of a lubricating fluid (e.g., oil) to be diverted between multiple filters of the lubrication system. Accordingly, certain embodiments may include diverting the flow from a first filter to a second filter, and removing the first filter without shutting down the compressor system. Further, embodiments of the lubrication system may have an integral valve including a valve block that is integrally cast into the compressor system. For example, in certain embodiments, the valve block may include a portion cast integrally with the gearbox and various passages disposed within the block. In other words, the valve block may be described as fixed, one piece, integral, or directly mounted with the compressor system rather than a separate valve with various conduits extending between. The passages of the valve block may include a rotary valve bore, and channels that route the lubricating fluid into the multiple filters and compressor components (e.g., bearings). Further embodiments of the lubrication system may include a rotary valve stem having multiple internal passages. The passages may be configured to align with various inlets and outlets of the valve block based on the angular position of the valve stem. For example, in one embodiment, an operator may rotate a handle of the rotary valve stem to divert flow from a common inlet to one of the two filters. Accordingly, embodiments of the system may enable a dual filter lubrication system to be integrally disposed in the compressor system and to provide for simplified assembly and operation.

FIG. 1 illustrates an embodiment of a compressor system 10. The compressor system 10 may be configured to compress gas in various applications, such as automotive, electronic, aerospace, oil and gas, power generation, petrochemical, and the like applications. Generally the compressor system 10 may include a reciprocating, rotary, axial, and/or a centrifugal compressor configuration. For example, the illustrated system 10 includes a centrifugal compressor. More specifically, the depicted embodiment includes a Turbo-Air 9000 manufactured by Cameron of Houston, Tex. In one embodiment, the compressor system 10 may include a power rating of approximately 150 to approximately 3,000 horsepower (HP), discharge pressures of approximately 80 to 150 pounds per square inch (PSIG) and an output capacity of approximately 600 to 15,000 cubic feet per minute (CFM). Other embodiments of the compressor system 10 may include various compressor arrangements and operational parameters. For example, the compressors system 10 may include a lower horsepower rating suitable for applications having a lower output capacity.

In the illustrated embodiment, the compressor system 10 includes a control panel 12, a drive unit 14, a compressor unit 16, an intercooler 17, a lubrication system 18, and a common base 20. The common base 20 may provide for simplified assembly and installation of each of the components of the compressor system 10. For example, the control panel 12, the drive unit 14, the compressor unit 16, intercooler 17, and the lubrication system 18 may be coupled to the common base 20 to provide a packaged compressor system 10 for simplified installation.

The control panel 12 may include various devices and controls configured to monitor and regulate operation of the compressor system 10. For example, the control panel 12 may include a switch to control system power, and/or numerous indicators (e.g., liquid crystal displays and/or light emitting diodes) indicative of operating parameters of the compressor system 10. In other embodiments, the control panel 12 may include advanced functionality, such as a PLC (programmable logic controller).

The drive unit 14 may generally include a device configured to provide motive power to the compressor system 10. For example, the illustrated drive unit 14 includes an electric motor. In other embodiments, the drive unit 14 may include a compression ignition (e.g., diesel) engine, a spark ignition (e.g., internal gas combustion) engine, a gas turbine engine, or other motive device. In one embodiment, the drive unit 14 may transfer motive power via rotating a drive shaft. The drive unit 14 may be coupled to the compressor unit 16 via the drive shaft. Accordingly, the drive unit 14 may provide motive power to operate the compressor unit 16 via rotation of the drive shaft.

For example, in the illustrated embodiment, the compressor unit 16 includes a gearbox 21 that may be coupled to the drive shaft. The gearbox 21 may include various gearing components that distribute the motive power from the engine 12 (e.g., rotation of the drive shaft) to three compressor scrolls. For instance, an impeller in each of a first stage compressor scroll 22, a second stage compressor scroll 24, and a third stage compressor scroll 26 may be driven (e.g., rotated) by motive power distributed via the gearbox 21. Further, the gearbox 21 may include features that provide for increased reliability and simplified maintenance of the system 10. For example, the gearbox 21 may include an integrally cast multi-stage design for enhanced performance. In other words, the gearbox 21 may include a singe casting including all three scrolls that may reduce the assembly and maintenance concerns typically associated with systems 10. Further, the gearbox 21 may include a horizontally spilt cover for easy removal and inspection of components disposed internal to the gearbox 21.

The compressor unit 16 may include a variety of configurations to provide compressed air. For example, the illustrated compressor unit 16 includes three compression stages (e.g., a three stage compressor), including the first stage compressor scroll 22, the second stage compressor scroll 24, and the third stage compressor scroll 26. Each of the compressor stages 22, 24 and 26 includes a centrifugal scroll having an internal impeller configured to compress the incoming gas. As discussed previously, each impeller may be operated (e.g., rotated) via power delivered from the drive unit 14 via the gearbox 21.

In operation of the illustrated system 10, incoming gas may be sequentially passed into each of the scrolls 22, 24 and 26 before being discharged at an elevated pressure. For example, operation of the system 10 may include drawing a gas into the first stage compressor scroll 22 via a compressor inlet 30. The compressor inlet 30 may draw gas into the compressor unit 16 in the direction of arrow 32. As illustrated, the compressor unit 16 also includes a guide vane 34. The guide vane 34 may include vanes and other mechanisms to direct the flow the gas as it enters the first compressor stage 22. For example, the guide vane 34 may impart a whirling motion to the inlet air flow in the same direction as the impeller of the first stage compressor scroll 22, reducing the work input.

After the gas is drawn into the system 10 via the compressor inlet 30, the first stage compressor 22 may compress and discharge the compressed gas. For example, rotation of the impeller of the first stage compressor scroll 22 compresses and discharges the gas via a first duct 36. As will be appreciated, compression of a gas generally causes the temperature of the gas to increase. Thus, the gas discharged from the first stage compressor scroll 22 via the first duct 36 may have an elevated temperature. Accordingly, the first duct 36 routes the compressed gas into a first stage 38 of the intercooler 17. Each stage of the intercooler 17 may include a heat exchange system to remove heat from the compressed gas. For example, the intercooler 17 may include a water-in-tube design that effectively removes heat from the compressed gases as they pass over heat exchanging elements internal to the intercooler 17. The intercooler 17 may also include a water manifold that enables fluid to flow between the stages. Generally, an intercooler stage may be provided after each compressor stage to reduce the gas temperature and to improve the efficiency of each subsequent compression stage. For example, in the three stage centrifugal compressor system 10, the compressed gas ejected from the first stage compressor scroll 22 is directed through the first stage intercooler 38 where the compressed is cooled, and is subsequently discharged via a second duct 40. In the illustrated embodiment, the second duct 40 routes the compressed gas into the second stage compressor scroll 24. Similar to the path previously discussed, the gas is further compressed and re-cooled before entering the third stage compressor scroll 26. For example, in the illustrated embodiment, the gas is further compressed via the second stage compressor scroll 24, and is cooled via the second stage intercooler 42.

Subsequent to being compressed by the third stage compressor scroll 26, the gas is discharged via a compressor discharge 44. In the illustrated embodiment, the gas exiting the third compressor scroll 26 is expelled from the discharge 44 in the direction of arrow 46. In certain embodiments, additional ducts may be coupled to the discharge 44 to effectively route the compressed gas for use in a desired application. For instance, the compressed gas may be employed for use in various industries and applications, including a plant environment to deliver high volumes of air for drying applications, to supply air driven instruments, and/or for cooling applications, and the like. Further, in the illustrated embodiment, the compressed gas is routed from the third stage compressor scroll 26 to the discharge 44 without an intermediate cooling step (e.g., passing through a third intercooler stage). However, other embodiments of the system 10 may include a third intercooler stage configured to cool the compressed gas as it exits the third stage compressor scroll 26.

As discussed previously, the compressor unit 16 may employ the energy supplied by the drive unit 14 (e.g., rotation of the drive shaft) to compress the incoming gas. In such compressor systems 10, there may be numerous rotating components that may rely on mechanisms (e.g., bearings) to reduce the resistance between components (e.g., drive shafts, impellers, etc.). Resistance between components may lead to a build up of heat. For instance, the resistance may be caused by rough interfaces, debris, and/or an absence of a lubricating fluid (e.g., oil) creating friction between components. Unfortunately, the increased friction and heat may lead to premature wear, reduced performance, reduced efficiency, and, in some cases, may cause a detrimental failure of a system 10. Accordingly, it is often desired that a lubricating fluid be circulated between components to reduce friction, as well as, remove heat and debris.

As will be appreciated, compressor systems typically employ a lubrication system that provides for circulation of a lubricating fluid or gas to critical components. For example, the compressor system 10 may generally include a lubricating fluid (e.g., oil) that is circulated through the lubrication system 18 via various lines and passages. To filter out debris that may be present in the lubricating fluid, the lubrication system 18 may include a filtration system (e.g. an oil filter). Thus, during circulation, oil may be routed into a filter, through a filter medium contained in the filter, and routed back into circulation. However, after a certain amount of use, the filter medium may become filled with debris, and the filter may be replaced to enable efficient flow of the lubricating fluid. Replacement of the filter may include removing (e.g. unscrewing or otherwise uncoupling) the filter from the system and replacing the filter. During removal and installation of the filter, the compressor system 10 may be shutdown to prevent oil from being spilled and/or discharged from the system 10 while the filter is removed. Unfortunately, shutting down a compressor 10 may not always be feasible. For example, shutdown of the system 10 may lead to increased labor, a lengthy downtime, and additional cost.

As discussed in detail below, the system 10 includes a lubrication system 18 including an integral valve 58 that provides for filtration of a lubricating fluid, and enables a filter 60 to be replaced or removed without shutting down the system 10. In other words, the filter 60 can be replaced during operation of the system 10 without any downtime. For example, the lubrication system 18 may include a return line 62 that terminates into an integral valve block 64 of the integral valve 58. Further, the lubrication system 18 may include a rotary valve stem 66 disposed in the integral valve block 64, such that rotating the rotary valve stem 66 diverts flow of the lubricating fluid between the first filter 60 and a second filter 68.

Figure 2:
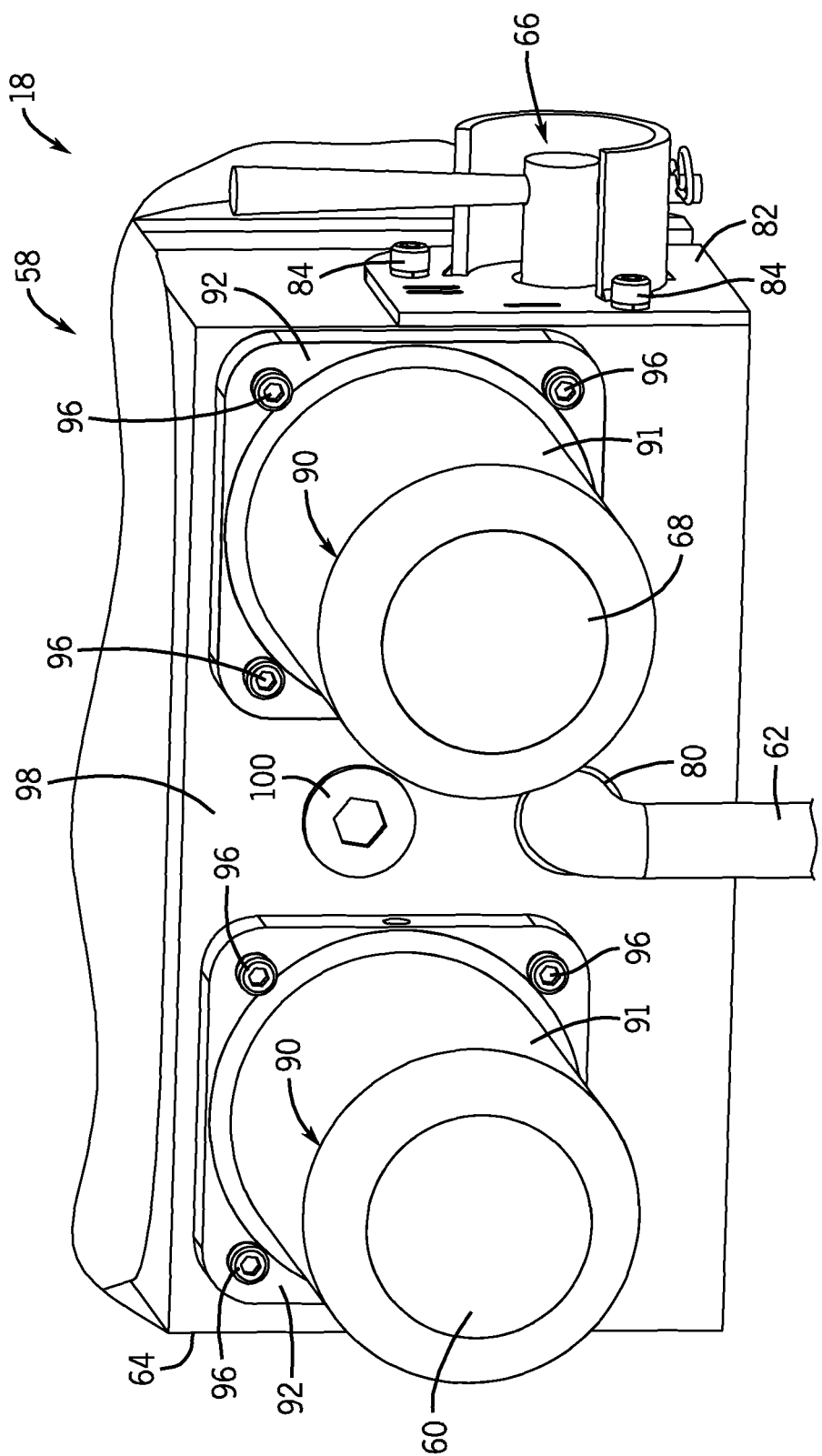
FIG. 2 is a perspective view of an embodiment of the lubrication system of the system of FIG. 1.

FIG. 2 illustrates an embodiment of the lubrication system 18. For example, the lubrication system 18 includes the first filter 60 and the second filter 68 coupled to the integral valve 58. The integral valve 58 includes the rotary valve stem 66 and the integral valve block 64. As discussed previously, the lubricating fluid may be circulated through the lubrication system 18 to filter out debris from the lubricating fluid. For example, the lubricating fluid may be routed from components of the system 10 via the return line 62 coupled to a fluid input 80 of the valve block 64. Lubricating fluid that enters the valve block 64 via the fluid input 80 may be routed via internal passages into the rotary valve stem 66. Based on the position of the valve stem 66, the lubricating fluid may then be routed into the first filter 60 or the second filter 68. After passing through the filters 60 or 68, the lubricating fluid may be returned into common passages in the valve block 64. In one embodiment, the common passages in the valve block 64 may route the lubricating fluid to various components within the system 10 and the gearbox 21, for instance. Then, the lubricating fluid may be circulated back to the valve block 64 via the return line 62. Again, as noted above, the valve block 64 may be directly fixed, mounted, or formed on the gear box 21 and/or other blocks 11 (FIG. 1) or components of the system 10. For example, the valve block 64 and the gearbox 21 may be integrally cast as a single block 13 (FIG. 1).

The return line 62 may include a tubing, or piping that routes the lubricating fluid into the valve block 64. For example, the return line 62 may include a 0.75 inch to 1.5 inch diameter tubing that routes and consolidates lubricating fluid flow that is circulated from multiple components, such as bearings and seals. Further, the return line 62 may include a threaded fitting configured to couple to the fluid input 80.

The rotary valve stem 66 may disposed internal to the valve block 64. For example, as is discussed in further detail below, the rotary valve stem 66 may be disposed in a bore machined into the valve block 64 and may be seated in the valve block 64 via a flange. For example, in the illustrated embodiment, the rotary valve stem 66 is seated in the valve block 64 via a rotary valve stem flange 82. The valve stem flange 82 may generally include a plate of material coupled to the valve block 64 that is configured to prevent the rotary valve stem 66 from being urged out of the valve block 64. In one embodiment, the valve stem flange 82 may be coupled to the valve block 64 via a fastener. For example, in the illustrated embodiment, the valve stem flange 82 is coupled to the valve block 64 via three bolts 84.

The first filter 60 and the second filter 68 may include a variety of configurations. In certain embodiments, the filters 60 and 68 may include different types of filters, such as oil or coolant filters, and may also include different configurations, such as those contained in a separate housing or a filter that is coupled directly via a thread. For example, in the illustrated embodiment, each of the filters 60 and 68 include a housing 90 that couples the filter 60 and 68 to the valve block 64. In the illustrated embodiment, the housing 90 includes a body 91 and a flange 92. The body 91 may provide a rigid enclosure of the internal filter medium, for example. The flange 92 may provide for coupling of the filter 60 and 68 to the valve block 64. For example, four bolts 96 may be employed to fasten each of the filters 60 and 68 to the valve block 64.

In some embodiments, the filters 60 and 68 may also include a sealing member disposed between the flange 92 and a front face 98 of the valve block 64. Accordingly, fastening the filters 60 and 68 may provide a fluid seal between the filters 60 and 68 and the front face 98 of the valve block 64. For example, the filters 60 and 68 may each include an annular gasket that is compressed by fastening the filter 60 and 68 to the front face 98 of the valve block 64. Accordingly, the gaskets may create a fluid seal that enables lubricating fluid to be circulated from the valve block 64 into an annular region of the filters 60 and 68, and that enables the lubrication fluid to be returned to the valve block 64 via a central passage in the filter 60 and 68. In one embodiment, the filter 60 may include a separate filter component disposed internal to the housing 90. In such an embodiment, the filters 60 and 68 may be disposed internal to the housing 90, and the housing 90 may be subsequently fastened to the valve block 64 to provide a fluid seal of the filters 60 and 68 against the front face 98 of the valve block 64. In another embodiment, the filter 60 and 68 may include a central thread that is fastened to a complementary thread of the valve block 64, such that the filters 60 and 68 are sealed against the front face 98.

The lubrication system 18 may also include various caps and plugs to seal passages of the valve block 64. For example, the lubrication system 18 includes a plug 100 disposed in the valve block 64. The plug 100 may include a threaded fitting coupled to a complementary thread in the valve block 64. In one embodiment, the plug 100 may be used to terminate a bore machined into the valve block 64. Accordingly, removal of the plug 100 may provide for access to passages internal to the block 64. As will be appreciated, any number and form of plugs 100 may be employed to seal and/or provide access to passages internal to the block 64.

Figure 3:
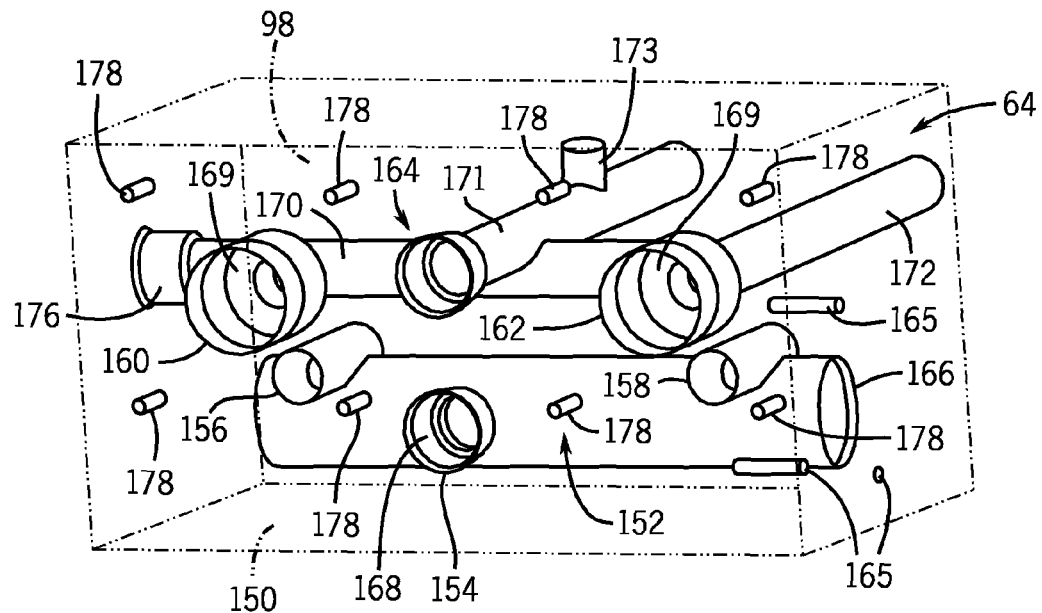
FIG. 3 is a perspective view of an embodiment of an integral block of the system of FIG. 2.

FIG. 3 illustrates an exemplary embodiment of the integral valve block 64. In one embodiment, the integral valve block 64 includes a body 150 that may be integrally cast into the compressor unit 16. The integral valve block 64 may include various passages that enable assembly of the rotary valve stem 66, and provide for routing of the lubricating fluid as discussed previously. For example, in the illustrated embodiment, the valve block 64 includes a rotary valve bore 152, an input passage 154, a first filter inlet 156, a second filter inlet 158, a first filter outlet 160, a second filter outlet 162, and exit channels 164.

The rotary valve bore 152 may be configured to receive the rotary valve stem 66. For example, in the illustrated embodiment, the rotary valve bore 152 includes a cylindrical channel running along a length of the valve block 64. In one embodiment, the rotary valve bore 152 may include a diameter and length configured to accept the rotary valve stem 66. Accordingly, the rotary valve stem 66 may be disposed in the rotary valve bore 152, and may be secured via the valve stem flange 82 and fasteners 84 (see FIG. 2) disposed in rotary valve flange threads 165.

Further, the rotary valve bore 152 may include other features conducive to circulating a lubricating fluid through the valve block 64. For example, in the illustrated embodiment, the rotary valve bore 152 includes a sealing face 166 machined into an exposed end of the bore 152. The sealing face 166 may include a recess or other geometry configured to accept a complementary sealing member (e.g., o-ring) disposed between the sealing face 166 and the rotary valve 66. Accordingly, when assembled, the sealing face 166 may prevent the lubricating fluid from being inadvertently discharged from the valve block 64 via the rotary valve bore 152.

The input passage 154 may provide for routing the lubricating fluid from the fluid input 80 to the rotary valve bore 152. For example, in the illustrated embodiment, the input passage 154 includes a bore that extends from the front face 98 of the valve block 64 to the rotary valve bore 152. In accordance with previous discussion regarding FIG. 2, the input passage 154 may include an input thread 168 to enable connection of the return line 62 to the valve block 64 at the fluid input 80. For example, the thread 168 may include a 0.75 inch to 1.5 inch thread configured mate with a complementary 0.75 inch to 1.5 inch thread of the return line 62.

Further, the first filter inlet 156 and the second filter inlet 158 may provide for circulation of the lubricating fluid from the rotary valve bore 152 to the filters 60 and 68 individually (e.g., without the other) or in combination with one another. In one embodiment, the lubricating fluid may be routed mutually exclusively into the first filter 60 via the first filter inlet 156, or into the second filter 68 via the second filter inlet 158. For example, in the illustrated embodiment, the first filter inlet 156 and the second filter inlet 158 each include a bore that extends from the front face 98 of the valve block 64, and tangentially intersects a portion of the rotary valve bore 152. In the illustrated embodiment, the first filter inlet 156 and the second filter inlet 158 are generally located at opposite ends of the rotary valve bore 152. In other embodiments, the first filter inlet 156 and the second filter inlet 158 may be located at various locations along the rotary valve bore 152. For example, an embodiment may include positioning the input passage 154 such that it intersects the rotary valve bore 152 near the seal face 166, and positioning the second filter inlet 158 proximate to the center of the length of the rotary valve bore 152.

The lubricating fluid may be returned from the filters 60 and 68 via the first filter outlet 160 and the second filter outlet 162, respectively. For example, the first filter inlet 156 may circulate the lubricating fluid into an annular region of the filter 60, and the lubricating fluid may be returned to the valve block 64 via an internal circular region aligned with the first filter outlet 160. In the illustrated embodiment, the first filter outlet 160 includes a bore that extends from the front face 98 of the valve block 64 to the exit channels 164. Similarly, the second filter outlet 162 includes a bore that extends from the front face 98 of the valve block 64 and terminates into the exit channels 164. Accordingly, as the lubricating fluid is returned from the filters 60 and 68, it may be routed to the exit channels 164. The first filter outlet 160 and the second filter outlet 162 may also include features to promote effective flow of the lubricating fluid. For example, the first filter outlet 160 and the second filter outlet 162 may include chamfers 169 to reduce the diameter of the each outlet 160 and 162 prior to their termination into the exit channels 164. In other embodiments, the outlets 160 and 162 may include additional features, such as threads to enable coupling of alternatively designed filters 60 and 68.

The exit channels 164 may include a single passage, or a plurality of passages that route the lubricating fluid out of the block 64. For example, the exit channels 164 may route the filtered lubricating fluid to components (e.g., bearings) or to other passages in fluid communication with components of the system 10. In the illustrated embodiment, the exit channels 164 include a common channel 170, a first channel 171, a second channel 172, and a third channel 173.

The common channel 170 may include a bore that routes the lubricating fluid from the first filter outlet 160 and the second filter outlet 162. For example, in the illustrated embodiment, the common channel 170 includes a bore that is generally oriented along the length of the valve block 64 such that it intersects both the first filter outlet 160 and the second filter outlet 162. Accordingly, as the lubricating fluid is circulated through either of the first filter 60 or the second filter 68, the lubricating fluid is routed into the common channel 170. In one embodiment, the common channel 170 may be formed by machining a bore into a side of the block 64. Thus, the common channel 170 may include a portion of the channel 170 exposed externally. Accordingly, in the illustrated embodiment, the common channel 170 may include a thread or recessed portion 176 configured to accept a plug, similar to plug 100 (see FIG. 2), to seal the end of the channel 170. In another embodiment, a line may be coupled to the common channel 170 via the thread 176. Thus, lubricating fluid may be routed from the exit channels 164 to other devices in the system 10 via external tubing. For example, the lubricating fluid may be routed to external devices, such as the drive unit 14, via a line coupled to the valve block 64 via thread 176.

In some embodiments, the valve block 64 may include additional exit channels 164 configured to route the lubricating fluid from the common channel 170 to various locations in the system 10. For example, in the illustrated embodiment, the exit channels 164 include the first channel 171 which intersects the common channel 170 to provide an additional passage to route the lubricating fluid exiting the filters 60 and 68. For example, the first channel 171 includes a bore that extends from the front face 98 of the valve block 64. In one embodiment, the first channel 171 may terminate into a passage that is configured to feed a lubricating fluid into the inner workings of the gearbox 21. Similarly, the illustrated exit channels 164 include the second channel 172 that may be configured to route lubricating fluid from the common channel 170 to other components of the system 10. The second channel 172 includes a bore that is aligned along a longitudinal axis of the second filter outlet 162. Further, the exit channels 164 include a third channel 173 that intersects the first channel 171. In one embodiment, the third channel 173 may divert a portion of the lubricating fluid to other locations in the system 10, such as additional bearings disposed in the gearbox 21. Accordingly, the exit channels 164 may provide for routing the lubricating fluid to various locations and passages in the system 10. Other embodiments may include various configurations of the exit channels 164. For example, additional channels may be provided to route the lubrication fluid to a plurality of locations.

The valve block 64 may also include features that enable coupling of the filters 60 and 68 to the valve block 64. For example, the illustrated embodiment of the valve block 64 includes eight filter flange threads 178. As discussed previously, each of the filter flange threads 178 may be configured to accept a fastener (e.g., bolt 96, see FIG. 2) used to couple the filters 60 and 68 to the valve block 64.

Figure 4:
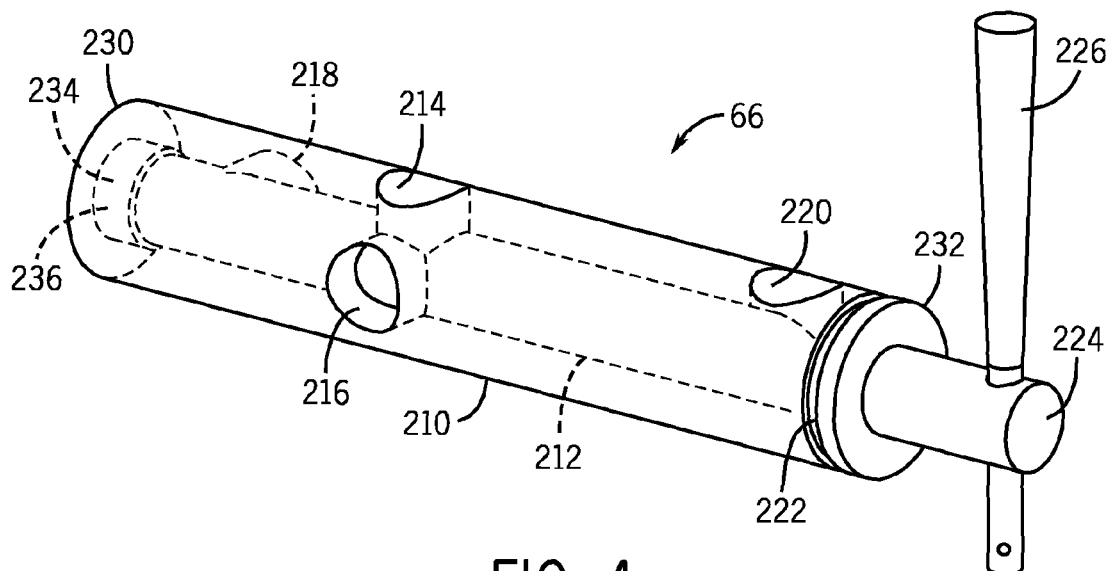
FIG. 4 is a perspective view of an embodiment of a rotary valve stem of the system of FIG. 2.

FIG. 4 illustrates an exemplary embodiment of the rotary valve stem 66. In the depicted embodiment, the rotary valve stem 66 includes a cylindrically shaped body that may be disposed in the rotary valve bore 152 of the valve block 64 (see FIG. 3). Embodiments of the rotary valve stem 66 may also include various internal passage that route the lubricating fluid to an appropriate filter 60 and 68. For example, the illustrated embodiment includes a rotary valve body 210 having a primary valve bore 212, a first valve inlet 214, a second valve inlet 216, a first valve outlet 218, a second valve outlet 220, a valve seal seat 222, a handle protrusion 224, and a handle 226. The primary valve bore 212 may include a longitudinal bore running substantially the length of the body 210. The first valve inlet 214, the second valve inlet 216, the first valve outlet 218, and the second valve outlet 220 may each include a bore intersecting the primary valve bore 212, and extending in a radial direction to an opening on the circumference of the rotary valve body 210. For example, the first valve inlet 214 includes a bore located proximate to the center of the rotary valve body 210 and extending to the circumference in a first direction. Similarly, the second valve inlet 216 includes a bore located proximate to the center of the rotary valve body 210 and extending to the circumference in a second direction that is rotated approximately 90 degrees from the first direction. Further, the first valve outlet 218 includes a bore that is located proximate to a first end 230 of the body 210 and extending to the circumference in a third direction that is rotated approximately 90 degrees from the first direction and 180 degrees from the second direction. Similarly, the second valve outlet 220 includes a bore that is located proximate to a second end 232 of the body 210, and extending to the circumference in the first direction.

The seal seat 222 may generally include a feature configured to receive a seal (e.g., o-ring) that is configured to seal an annular region between the rotary valve bore 210 and a surrounding passage (e.g., the rotary valve bore 152). For example, in the illustrated embodiment, the seal seat 222 includes a notch that extends around the circumference of the rotary valve bore 210 proximate to the second end 232. Accordingly, the seal may be disposed in the notch such that a seal may be formed between the rotary valve body 210 and the sealing face 166 the rotary valve bore 152 (see FIG. 3).

The handle 226 and the handle protrusion 224 may be configured to enable rotation of the rotary valve stem 66. For example, in the illustrated embodiment, the handle protrusion 224 includes an integral member extending from the second end 232 of the rotary valve body 210 and having the handle 226 disposed through the protrusion 224. Accordingly, applying a force (e.g., an operator moving the handle 226) may rotate the rotary valve 66. In one embodiment with the rotary valve stem 66 disposed in the rotary valve bore 152 of the valve block 64, a user may rotate the handle 226 to rotate the rotary valve stem 66 to adjust or align the passages of the rotary valve stem 66 to the passages of the valve block 64.

The rotary valve stem 66 may also include additional features to provide for routing of the lubricating fluid. For instance, in the illustrated embodiment, the rotary valve stem 66 includes a valve cap 234 coupled to a valve cap thread 236 in the primary valve bore 212 and proximate to the first end 230 of the rotary valve body 210. The valve cap 234 may provide for sealing the primary valve bore 212 such that the lubricating fluid enters and exits the primary bore 212 via the inlets 214 and 216 and the outlets 218 and 220, respectively. In other embodiment, a valve cap 234 may not be used. For example, the primary valve bore 212 may seal against a wall of the rotary valve bore 152 (see FIG. 2) abutting the first end 230 of the rotary valve body 210.

In operation, the integral valve 58 of the lubrication system 18 may generally include the rotary valve stem 66 assembled into the rotary valve bore 152. Accordingly the circulation of the lubricating fluid may be diverted between the first filter 60 and the second filter 68 based on the position of the valve stem 66 relative to the rotary valve block 64.

In a first filter stage or position, the rotary valve 66 may be positioned such that the lubricating fluid is circulated through the first filter 60. For example, the rotary valve stem 66 may be disposed such that the first valve inlet 214 is aligned with the input passage 154, and the first valve outlet 218 is aligned with the intersection of the rotary valve bore 152 and the first filter inlet 156. In this first filter position, the second valve inlet 216 is rotated 90 degrees past the input passage 154 and, thus, does not receive the circulating lubricating fluid. Similarly, the second valve outlet 220 is rotated such that it does not align with the intersection of the rotary valve bore 152 and the second filter inlet 158, but is, instead, rotated such that the second valve outlet 220 terminates and seals against the wall of the rotary valve bore 152. Accordingly, in the first filter position, lubricating fluid that is routed into the input passage 154 (e.g., via the return line 62) will be routed into the primary valve bore 212 via the first valve inlet 214, and the lubricating fluid is discharged from the primary valve bore 212 via the first valve outlet 218. Subsequent to exiting the first valve outlet 218, the lubricating fluid is routed into the first filter 60 via the first filter inlet 156. The lubricating fluid may, then, exit the filter 60 via the first filter outlet 160, and may be distributed to the system 10 via the exit passages 164.

In a second filter stage or position, the rotary valve 66 may be positioned such that the lubricating fluid is circulated through the second filter 68. For example, the rotary valve 66 may be disposed such that the second valve inlet 216 is aligned with the input passage 154, and the second valve outlet 220 is aligned with the intersection of the rotary valve bore 152 and the second filter inlet 158. In this embodiment, the first valve inlet 214 is rotated 90 degrees past the input passage 154 and, thus, does not receive the circulating lubricating fluid. Similarly, the first valve outlet 218 is rotated such that it does not align with the an intersection of the rotary valve bore 152 and the first filter inlet 156, but is, instead, rotated such that the first valve outlet 218 terminates and seals against the wall of the rotary valve bore 152. Accordingly, in the second filter position, lubricating fluid that is routed into the input passage 154 (e.g., via the return line 62) is routed into the primary valve bore 212 via the second valve inlet 216, and the lubricating fluid is discharged from the primary valve bore 212 via the second valve outlet 220. Subsequent to exiting the second valve outlet 220, the lubricating fluid is routed into the second filter 68 via the second filter inlet 158. The lubricating fluid may, then, exit the second filter 68 via the first second filter outlet 162 and may be distributed to the system 10 via the exit passages 164. Other embodiments may include any number of valve positions and filters. For example, the rotary valve 66 and the valve block 64 may be configured with the first filter position, the second filter position, a third filter position enabling fluid flow simultaneously through both filters 60 and 68, a fourth filter position bypassing both filters 60 and 68, and/or additional positions for one or more other filters. By further example, the lubrication system 18 may include a third filter, and the rotary valve 66 may include an additional inlet and outlet, such that rotating the valve stem 66 to a third position routes the lubrication fluid through the third filter.

The illustrated lubrication system may include various uses including those discussed previously. For example, the disclosed system 10 may be particularly useful when a filter 60 and/or 68 is removed (e.g., replaced). Accordingly, one embodiment of a method of use may include employing the integral valve 58 to divert fluid flow from one of the filters 60 or 68 while it is removed from the system 10. For example, the method may include, first, rotating the handle 226 of the rotary valve stem 66 an appropriate amount (e.g., 90 degrees) to prevent the lubricating fluid from entering the first filter 60 and, thus, to divert the flow of the lubricating fluid into the second filter 68. Next, the operator may remove and replace the first filter 60. Finally, the operator may return the integral valve 58 to the desired operating condition. For example, if it is desirable that the lubricating fluid be circulated through the first filter 60, the operator may rotate the handle 226 in the opposite direction 90 degrees (e.g., back to its original position) to divert the flow of the lubricating fluid into the first filter 60 and, thus, prevent lubrication fluid from flowing into the second filter 68. However, if it is desired that the lubricating fluid be circulated through the second filter 68, the handle 226 may remain in the rotated position such that fluid continues to circulate through the second filter 68.

Figure 5:
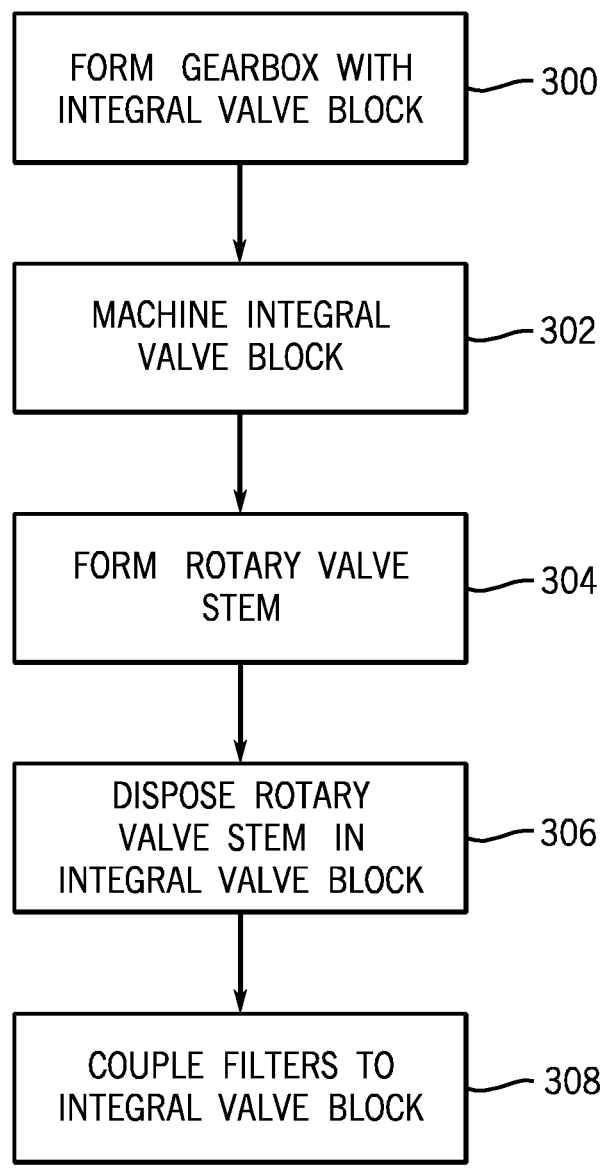
FIG. 5 is a flowchart illustrating a method of manufacturing the lubrication system of the system of FIG. 1.

FIG. 5 includes a flowchart depicting an exemplary embodiment of a method of manufacturing the lubrication system 18. In the illustrated embodiment, manufacture of the lubrication system 18 includes forming the valve block 64, forming the valve stem 66, assembling the valve stem 66 to the valve block 64, and assembling the filters 66 and 68 to the valve block 64. The first step includes forming a gearbox with an integral valve block, as depicted at block 300. For example, the integral valve block 64 may be integrally cast as a protrusion of the gearbox 21. In other embodiments, the valve block 64 may include a separate component that is formed and subsequently coupled directly to the system 10. For example, forming the gearbox with integral valve block (block 300) may include forming the gearbox 21 configured to accept the valve block 64, forming the valve block 64 separately, and coupling the valve block 64 directly to the gearbox 21, such that it is securely mounted on the system 21. Both integral casting and direct mounting can substantially reduce or eliminate various external conduits leading between the valve block 64 and the system 10. For example, an embodiment may include excluding all external conduits to/from the valve, including the line 62. Thus, even the line 62 may be integral to the valve block 64. Next, the manufacturing process may include machining the integral valve block, as depicted at block 302. For example, an embodiment may include machining the faces of the valve block (e.g., the front face 98) and passages (e.g., the rotary valve bore 152, the filter inlets 156 and 158, the exit channels 164, and the like). Further, the method includes forming the rotary valve stem, as depicted at block 304. For example, an embodiment may include machining the rotary valve stem 66 from a blank stock. Machining may include forming the rotary valve body 210, the inlets 214 and 216, the outlets 218 and 220, the valve seal seat 222, and the like. Further, the handle 226 may be assembled to the handle protrusion 224. Subsequently, the method may include disposing the rotary valve in the integral valve block, as depicted at block 306. For example, the rotary valve 66 may be slid into the rotary valve bore 152 and secured via attachment of the valve stem flange 82. Further, the method may include coupling the filters to the valve block 64, as depicted at block 308. For example, one embodiment may include coupling the filter to the valve block 64 via the flange 92. It will be appreciated that other methods are contemplated by the exemplary method of FIG. 5. For example the sequence of blocks 302 and 304 or blocks 306 and 308 may be reversed or generally rearranged.

During operation of the system 10, the lubrication system 18 may experience a significant differential in the maximum and minimum temperatures experienced by the components due to the heating of the lubricating fluid. In other words, as the system 10 operates, the temperature of the lubricating fluid may rise and, thus, heat the valve block 64 and the valve stem 66. As will be appreciated, the fluctuation in temperature may cause each of the components to expand and/or contract. The amount of expansion and/or contraction experienced by each component is generally characterized by the coefficient of thermal expansion of the material used to form the component. Thus, if adjacent components are formed from materials with different coefficients of thermal expansion, each of the components may expand at a different rate, leading to gaps forming between components, or increased interferences. Accordingly, to provide for efficient and reliable operation of the system 10, certain embodiments may also include forming the valve block 64, and the rotary valve stem 66 from a material with similar thermo-mechanical properties (e.g., coefficients of thermal expansion). For instance, in one embodiment, the valve block 64 and the valve stem 66 may both be formed from a similar or identical steel material. Similarly, in another embodiment, the valve block 64 and the valve stem 66 may both be formed from an aluminum material having the same or similar coefficients of thermal expansion.

Further, embodiments of the integral valve 58 and the integral valve block 64 may be suited for applications in addition to compressor systems 10. For example, embodiments may include providing the integral valve 58 coupled to and/or integral with a compression ignition (e.g., diesel) engine, a spark ignition (e.g., internal gas combustion) engine, a gas turbine engine, or other devices that may generally include circulating a lubricating fluid. Further, these devices may be used in various other industries, such as in the oil and gas industry that includes offshore platforms, wellheads, and other systems that support the extraction of natural resources from a mineral reservoir.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A system, comprising:
a one-piece valve block, comprising:
a valve bore internally within the one-piece valve block, wherein the valve bore is configured to support a movable valve;
a first passage internally within the one-piece valve block;
a first filter interface comprising a first set of block ports and a first filter mount configured to couple a first filter directly to the one-piece valve block, wherein the first set of block ports comprises a first block port coupled to the valve bore and a third block port coupled to the first passage, the valve bore and the first passage are isolated from one another within the one-piece valve block, and the first and third block ports are configured to couple with the first filter to route the lubricating fluid through the first filter without a second filter;
a second passage internally within the one-piece valve block; and
a second filter interface comprising a second set of block ports and a second filter mount configured to couple the second filter directly to the one-piece valve block, wherein the second set of block ports comprising a second block port coupled to the valve bore and a fourth block port coupled to the second passage, the valve bore and the second passage are isolated from one another within the one-piece valve block, and the second and fourth block ports are configured to couple with the second filter to route the lubricating fluid through the second filter without the first filter;
wherein the one-piece valve block is configured to couple directly to a machine.

2. The system of claim 1, comprising the movable valve disposed in the valve bore, wherein the movable valve comprises at least one passage configured to selectively route the lubricating fluid through the first block port or the third block port.

3. The system of claim 2, wherein the movable valve comprises a rotary valve is configured to rotate between a first filter position and a second filter position, the rotary valve has a first valve port of the at least one passage aligned with the first block port in the first filter position, and the rotary valve has a second valve port of the at least one passage aligned with the second block port in the second filter position.

4. The system of claim 3, wherein the rotary valve has a third valve port of the at least one passage aligned with a fifth block port in the first filter position, and the rotary valve has a fourth valve port of the at least one passage aligned with the fifth block port in the second filter position.

5. The system of claim 4, wherein the at least one passage comprises a lengthwise bore linking together the first, second, third, and fourth valve ports.

6. The system of claim 5, wherein the first valve port is disposed at a first axial position along the lengthwise bore, the second valve port is disposed at a second axial position along the lengthwise bore, and the third and fourth valve ports are both disposed at a third axial position along the lengthwise bore, wherein the first, second, and third axial positions are different from one another.

7. The system of claim 1, comprising the machine having a gearbox, a motor, a compressor, a pump, a transmission, a control, or a combination thereof, wherein the one-piece valve block is directly coupled to the machine, and the second passage of the one-piece valve block directly couples to an internal passage of the machine.

8. The system of claim 1, comprising the movable valve disposed within the valve bore of the one-piece valve block, wherein the movable valve comprises an axial bore and a plurality of radial passages coupled to the axial bore, the radial passages are disposed at two or more axial positions that are axially offset from one another relative to an axis of the axial bore, and the movable valve is configured to move within the valve bore to move the radial passages into alignment and out of alignment with the first block port, the third block port, and at least one additional block port.

9. The system of claim 8, wherein the movable valve is a rotatable valve, and the axis is a rotational axis of the rotatable valve.

10. The system of claim 1, wherein the one-piece valve block is configured to selectively enable at least three flow configurations, including: fluid flow only through the first filter, fluid flow only through the second filter, and fluid flow simultaneously through both the first and second filters.

11. The system of claim 1, wherein the one-piece valve block comprises a common passage extending between the third and fourth block ports and a common block port.

12. A system, comprising:
a compressor; and
a valve block coupled directly to the compressor, wherein the valve block is configured to selectively route a lubricating fluid through a plurality of filters and the compressor, and the valve block comprises:
a first filter passage and a third filter passage extending internally through the valve block, wherein the first and third filter passages are configured to circulate the lubricating fluid through a first filter;

a second filter passage and a fourth filter passage extending internally through the valve block, wherein the second and fourth filter passages are configured to circulate the lubricating fluid through a second filter; and a valve bore coupled to the first and second filter passages internally within the valve block, wherein the valve bore is isolated from the third and fourth filter passages internally within the valve block; and a rotary lubricant valve disposed in the valve bore, wherein the rotary lubricant valve comprises an axial bore and a plurality of radial passages coupled to the axial bore, the radial passages are disposed at two or more axial positions that are axially offset from one another relative to a rotational axis of the axial bore, and the rotary lubricant valve is rotatable within the valve bore to selectively align first and second radial passages of the plurality of radial passages with the first and second filter passages to enable and disable circulation of the lubricating fluid through the first and second filters.

13. The system of claim 12, wherein the valve block comprises a first common passage and a second common passage, the rotary lubricant valve comprises third and fourth radial passages of the plurality of the radial passages configured to selectively align with the first common passage, and the second common passage extends between the third and fourth filter passages.

14. A system, comprising:
a valve assembly, comprising:
a valve block configured to selectively route a fluid through a plurality of filters, wherein the valve block comprises:
a first filter passage and a third filter passage extending internally through the valve block, wherein the first and third filter passages are configured to circulate the fluid through a first filter;

a second filter passage and a fourth filter passage extending internally through the valve block, wherein the second and fourth filter passages are configured to circulate the fluid through a second filter; and a valve bore coupled to the first and second filter passages internally within the valve block, wherein the valve bore is isolated from the third and fourth filter passages internally within the valve block; and a rotary valve disposed in the valve bore, wherein the rotary valve comprises:
an axial bore extending internally through the rotary valve along a rotational axis of the rotary valve; and
a plurality of radial passages extending internally through the rotary valve from an exterior to the axial bore, wherein the radial passages are disposed at two or more axial positions that are axially offset from one another relative to the rotational axis of the axial bore, and the rotary valve is rotatable within the valve bore to selectively align first and second radial passages of the plurality of radial passages with the first and second filter passages to enable and disable circulation of the fluid through the first and second filters.

15. The system of claim 14, wherein the valve block comprises a first common passage and a second common passage, the rotary valve comprises third and fourth radial passages of the plurality of the radial passages configured to selectively align with the first common passage, and the second common passage extends between the third and fourth filter passages.

* * * * *